United States Patent
Hilmann et al.

(10) Patent No.: US 11,128,007 B2
(45) Date of Patent: Sep. 21, 2021

(54) ELECTRIFIED VEHICLE WITH BATTERY ARRANGEMENT INCLUDING GUIDE PERMITTING RELATIVE TRANSVERSE MOVEMENT OF INDIVIDUAL MODULES

(71) Applicant: Ford Global Technologies, LLC, Dearborn, MI (US)

(72) Inventors: Joergen Hilmann, Leverkusen (DE); Marius Sawatzki, Pulheim (DE); Dominik Mueller, Euskirchen (DE); Daniel Meckenstock, Wuppertal (DE)

(73) Assignee: Ford Global Technologies, LLC, Dearborn, MI (US)

( * ) Notice: Subject to any disclaimer, the term of this patent is extended or adjusted under 35 U.S.C. 154(b) by 307 days.

(21) Appl. No.: 16/359,273

(22) Filed: Mar. 20, 2019

(65) Prior Publication Data

US 2019/0312247 A1    Oct. 10, 2019

(30) Foreign Application Priority Data

Apr. 6, 2018    (DE) .......................... 102018205234.4

(51) Int. Cl.
*H01M 50/20*    (2021.01)
*B60K 1/04*    (2019.01)
*B62D 21/15*    (2006.01)

(52) U.S. Cl.
CPC ............... *H01M 50/20* (2021.01); *B60K 1/04* (2013.01); *B62D 21/157* (2013.01); *B60K 2001/0438* (2013.01); *B60Y 2306/01* (2013.01)

(58) Field of Classification Search
None
See application file for complete search history.

(56) References Cited

U.S. PATENT DOCUMENTS

| | | | |
|---|---|---|---|
| 9,579,963 | B2 | 2/2017 | Landgraf |
| 10,780,923 | B2 * | 9/2020 | Caliskan ................ B62D 21/07 |
| 2017/0029034 | A1 | 2/2017 | Faruque et al. |

FOREIGN PATENT DOCUMENTS

| | | |
|---|---|---|
| DE | 102008059973 A1 | 6/2010 |
| DE | 102009052371 A1 | 6/2010 |
| DE | 102009006991 A1 | 8/2010 |
| DE | 102010050826 A1 | 5/2012 |

(Continued)

OTHER PUBLICATIONS

Kukreja, J. et al. "Crash Analysis of a Conceptual Electric Vehicle With a Damage Tolerant Battery Pack," Mechanics of Energy Materials, Extreme Mechanics Letter, vol. 9, Part 3, Dec. 2016, pp. 371-378. Downloaded from http://dx.doi.org/10.1016/j.eml.2016.05.004.

*Primary Examiner* — Tracy M Dove
(74) *Attorney, Agent, or Firm* — David B. Kelley; Carlson, Gaskey & Olds, P.C.

(57) ABSTRACT

This disclosure relates to a battery arrangement for an electrified vehicle. In particular, the battery arrangement includes modules which are configured to move relative to one another in a transverse direction. For instance, an example battery arrangement includes a guide, and first and second battery modules. The guide is arranged at least partially between adjacent surfaces of the battery module housings and is configured to permit the first and second battery modules to slide relative to one another in a transverse direction of the electrified vehicle.

17 Claims, 2 Drawing Sheets

(56) References Cited

FOREIGN PATENT DOCUMENTS

| DE | 202016103720 U1 | 8/2016 |
|----|-----------------|--------|
| DE | 102016217934 A1 | 3/2018 |
| WO | 2013000548 A1 | 1/2013 |

\* cited by examiner

ELECTRIFIED VEHICLE WITH BATTERY ARRANGEMENT INCLUDING GUIDE PERMITTING RELATIVE TRANSVERSE MOVEMENT OF INDIVIDUAL MODULES

RELATED APPLICATION(S)

This application claims priority to German Patent Application No. 102018205234.4, filed on Apr. 6, 2018, the entirety of which is herein incorporated by reference.

TECHNICAL FIELD

This disclosure relates to a battery arrangement for an electrified vehicle. In particular, the battery arrangement includes modules which are configured to move relative to one another in a transverse direction.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs). The traction battery is a relatively high-voltage battery that selectively powers the electric machines, and potentially other electrical loads of the electrified vehicle. The traction battery can include battery arrays each including a plurality of interconnected battery cells that store energy.

Batteries for electrified vehicles are often mounted in a vehicle below the passenger compartment floor, where the battery is protected by various structures such as cross members and side sills, which are stabilizing side frame structures that lie approximately at the height of the subfloor. The central subfloor region forms a relatively safe zone for a battery in the event of an impact.

SUMMARY

A battery arrangement for an electrified vehicle according to an exemplary aspect of this disclosure includes, among other things, a guide, and first and second battery modules each including a battery module housing. The guide is arranged at least partially between adjacent surfaces of the battery module housings and is configured to permit the first and second battery modules to slide relative to one another in a transverse direction of the electrified vehicle.

In a further non-limiting embodiment of the foregoing battery arrangement, the guide includes a vertical section arranged longitudinally between the adjacent surfaces of the battery module housings, and further includes horizontal projections projecting from ends of the vertical section and configured to restrict vertical movement of the first and second battery modules.

In a further non-limiting embodiment of any of the foregoing battery arrangements, the guide has an I-shaped cross-sectional profile.

In a further non-limiting embodiment of any of the foregoing battery arrangements, the adjacent surfaces include an aft surface of the battery module housing of the first battery module and a fore surface of the battery module housing of the second battery module.

In a further non-limiting embodiment of any of the foregoing battery arrangements, the first and second battery modules each have a length extending in the transverse direction.

In a further non-limiting embodiment of any of the foregoing battery arrangements, the adjacent surfaces of the battery module housings of the first and second battery modules each include an elongated hole extending in the transverse direction, and the guide includes an elongated hole extending in the transverse direction.

In a further non-limiting embodiment of any of the foregoing battery arrangements, the arrangement includes at least one flexible line extending between the first battery module and the second battery module by passing through the elongated holes of the battery module housings and the guide.

In a further non-limiting embodiment of any of the foregoing battery arrangements, the at least one flexible line is configured to connect the first battery module to the second battery module either fluidly, mechanically, or electronically.

In a further non-limiting embodiment of any of the foregoing battery arrangements, the elongated holes are at least as long as a sum of a maximum relative displacement of the first and second battery modules and of a thickness of the at least one flexible line.

In a further non-limiting embodiment of any of the foregoing battery arrangements, the elongated holes of the battery module housings of the first and second battery modules and the guide are at least partially aligned with one another in a normal operating condition.

In a further non-limiting embodiment of any of the foregoing battery arrangements, the first and second battery module housings are mechanically connected together by at least one shear bolt configured to break upon application of a force exceeding a predetermined amount.

In a further non-limiting embodiment of any of the foregoing battery arrangements, the first and second battery modules are arranged within a battery housing less rigid in the transverse direction than each of the first and second battery modules and the guide.

In a further non-limiting embodiment of any of the foregoing battery arrangements, the guide is at least as rigid as the first and second battery modules.

In a further non-limiting embodiment of any of the foregoing battery arrangements, the battery housing tapers in a front direction.

In a further non-limiting embodiment of any of the foregoing battery arrangements, the battery arrangement includes at least one additional battery module within the battery housing.

In a further non-limiting embodiment of any of the foregoing battery arrangements, the guide is formed separately from the battery module housings, and the guide is configured to move independently of the first and second battery modules.

An electrified vehicle according to an exemplary aspect of the present disclosure includes, among other things, a battery arrangement positioned on or under a subfloor of the electrified vehicle. The battery arrangement includes a guide and first and second battery modules each including a battery module housing. The guide is arranged at least partially between adjacent surfaces of the battery module housings and is configured to permit the first and second battery modules to slide relative to one another in a transverse direction of the electrified vehicle.

In a further non-limiting embodiment of the foregoing electrified vehicle, the guide includes a vertical section arranged longitudinally between the adjacent surfaces of the battery module housings, and further includes horizontal projections projecting from ends of the vertical section and configured to restrict vertical movement of the first and second battery modules.

In a further non-limiting embodiment of any of the foregoing electrified vehicles, the guide has an I-shaped cross-sectional profile.

In a further non-limiting embodiment of any of the foregoing electrified vehicles, the guide is formed separately from the battery module housings of the first and second battery modules, and the guide is configured to move independently of the first and second battery modules.

DETAILED DESCRIPTION

Figure 1:
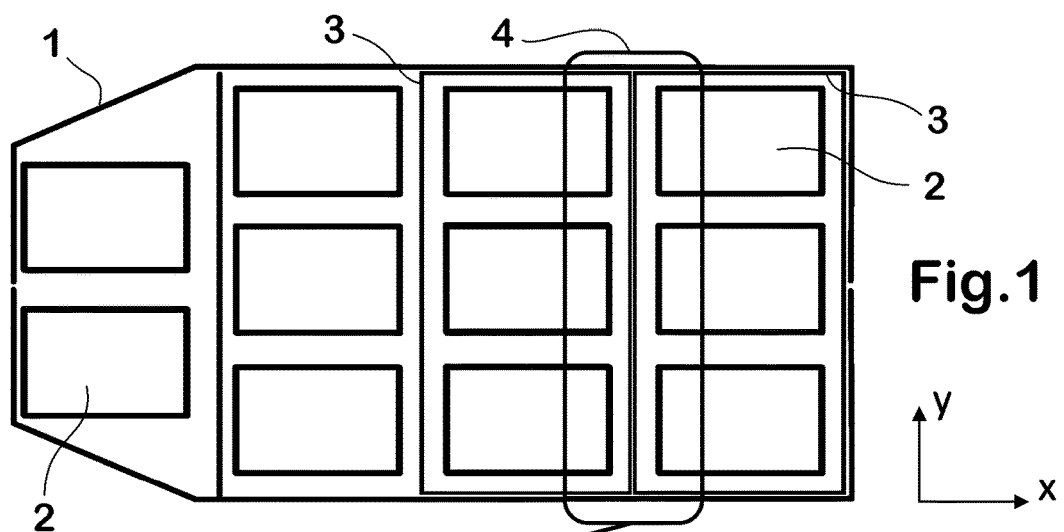
FIG. 1 schematically illustrates an example battery arrangement from a top view.

This disclosure relates to a battery arrangement for an electrified vehicle. In particular, the battery arrangement includes modules which are configured to move relative to one another in a transverse direction. For instance, an example battery arrangement includes a guide, and first and second battery modules. The guide is arranged at least partially between adjacent surfaces of the battery module housings and is configured to permit the first and second battery modules to slide relative to one another in a transverse direction of the electrified vehicle. Accordingly, this disclosure increases safety, especially in the context of a side impact, while saving space and without requiring undue reinforcements of the vehicle chassis structure, which would increase the weight of the vehicle and reduce the energy efficiency the vehicle. These and other benefits will be appreciated from the following description.

In accordance with this disclosure, a guide that extends in the transverse direction of the vehicle is arranged between each two adjacent battery module housings. The guide is equal to or shorter in length than the length the battery module housings, and is movable in the transverse direction of the vehicle independently of the battery module housings. The guide has a positive-locking connection with the battery module housings, which permits the battery module housings to move in the transverse direction of the vehicle.

Each guide forms an additional load path in the transverse direction of the vehicle. The guide also transmits loads from a side impact onto the opposite side of the vehicle such that collision loads are dispersed and absorbed. The present disclosure provides a symmetrical, and consequently more advantageous, distribution of energy to both sides of the vehicle. Furthermore, the guides in accordance with this disclosure stabilize the battery housing, and make the battery more mechanically durable. Furthermore, the battery arrangement in accordance with this disclosure is less liable to generate distracting noises due to vibrations.

The positive-locking connection between the guide and the battery module housings may in particular be based on the fact that the guide surrounds the adjacent sections of the battery module housings in a positive-locking manner. Further, the rigidity of the guide in the transverse may be greater than the corresponding localized rigidity of the battery module housing. Also, the battery module housings may be more rigid in the transverse direction of the vehicle than the surrounding battery housing. Nevertheless, the battery module housings that have guides placed between them may also be less rigid since the guides also transmit impact forces onto the opposite side of the vehicle.

In one embodiment, the guide has an I-shaped (i.e., similar in cross-section to an I-beam; less commonly, the guide may be referred to as "double-T" shaped) cross-sectional profile, which is provided by metal having a vertical section (i.e., a web) with surfaces that form sliding surfaces with the surfaces of the adjacent sections of the battery module housings. The I-shaped cross-sectional profile also includes horizontal projections (i.e., flanges) at ends of the vertical section. The horizontal projections provide a positive-locking connection and restrict movement of the battery module housings in the vertical direction of the vehicle.

In another aspect of this disclosure, mutually facing, adjacent surfaces of battery module housings as well as the inner surface of the guide comprise elongated holes that extend in the transverse direction of the vehicle at least over a length that is twice as long as a design-based maximum relative displacement of each battery module housing in relation to the guide. The elongated holes are aligned with one another during normal operating conditions. Further, flexible lines that connect adjacent battery module housings pass through the elongated holes. This enables the flexible connecting lines, which may be power cables and/or coolant pipes, to remain relatively short in length and to be accommodated in a space-saving and well protected manner.

The battery arrangement is particularly suitable as a motor vehicle traction battery that has been configured so as to be mounted either on or under the subfloor of the motor vehicle between the vehicle axles and between the side sills that run in the longitudinal direction of the vehicle.

FIG. 1 illustrates a battery housing 1 that is arranged on or under a subfloor of an electrified vehicle between the transverse-extending front and rear axles and the longitudinally-extending side sills. For reference, the transverse and longitudinal directions are the "y" and "x" directions, respectively, in FIG. 1.

The battery housing 1 comprises multiple battery modules, each of which encloses battery cells 2, which may be individual cells or arrays of cells. The battery housing 1 tapers toward the vehicle front in this example. In the example of FIG. 1, the two rearmost battery modules (relative to the longitudinal direction x) include individual battery module housings 3. The two front battery modules may also include individual module housings or be provided in the same housing. While a particular number of battery cells 2 and battery module housings 3 are shown in FIG. 1, it should be understood that this disclosure extends to different arrangements including a different number or configuration of the battery cells 2 and battery module housings 3.

The battery module housings 3 are arranged such that their length dimensions are arranged in the transverse direction y. The battery module housings 3 are also arranged one-behind-the-other relative to the longitudinal direction x. Further, the battery module housings 3 are within the battery housing 1, which effectively serves as a common outer case for all of the battery module housings 3. The battery module housings 3 are more rigid in the transverse direction y than the surrounding battery housing 1, as will be appreciated from the below.

The battery module housings 3 are configured to move relative to one another in the transverse direction y in response to a side impact. During normal operating conditions, however, the battery module housings 3 may be connected to one another and/or to the battery housing 1 by a mechanical connection that is configured to break when a predetermined force is exceeded. In particular, the battery module housings 3 may be connected with shear bolts, configured to hold the battery module housings 3 during normal conditions, but configured to break and permit relative transverse movement of the battery module housings 3 when a side impact force exceeds a predetermined force.

Figure 2:
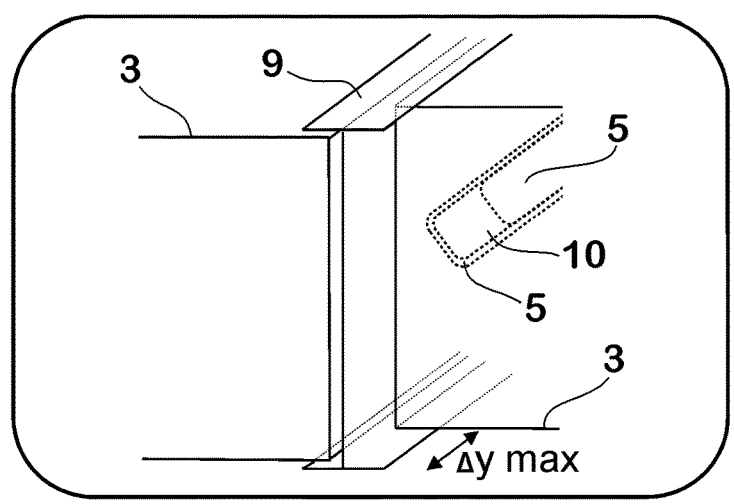
FIG. 2 is a partial perspective view of two adjacent battery modules of the arrangement of FIG. 1.

In this disclosure, the battery module housings 3 are connected together in a way that prevents relative movement in the vertical direction (i.e., in-and-out of the page, relative to FIG. 1). FIG. 2 illustrates an example arrangement of adjacent battery module housings 3.

As shown in FIG. 2, a guide 9 is arranged at least partially between adjacent surfaces of the battery module housings 3. While in FIG. 2 only one guide 9 is shown, it should be understood that there may be additional guides 9 within the battery housing 1. In one example, there is one guide 9 between each adjacent battery module housing 3. Thus, in that example, when there are additional battery module housings 3 there will be additional guides 9.

In this example, the guide 9 has an I-shaped cross-sectional profile with a vertical section (i.e., web) arranged between mutually facing, adjacent surfaces of the battery module housings 3, and further has projections (i.e., flanges) projecting normally from ends of the vertical section. The vertical section extends both vertically and in the transverse direction y, whereas the horizontal projections extend in opposing longitudinal directions x from the ends of the vertical section while also extending in the transverse direction y. The guide 9 resembles an I-beam in cross-section. The guide 9 may be provided by a metal material.

The vertical section of the guide 9 is slightly higher than the battery module housings 3 are in height, and the inner surfaces of the vertical section form sliding surfaces with the surfaces of the adjacent battery module housings 3. In other words, the mutually facing surfaces of the two adjacent battery module housings 3 and the guide 9 have complimentary cross sections that engage with one another in a positive-locking manner. The battery module housings 3 are vertically bound by the projections of the guide 9. Thus, the guide 9 restricts vertical movement of the battery module housing 3 while permitting sliding of the battery module housings 3 in the transverse direction y.

In an example, each guide 9 is equal in length or shorter than the battery module housings 3, and is at least as rigid as the battery module housings in the transverse direction y. In particular, each guide 9 is more rigid than the surrounding battery module housing 1 within the corresponding region, and in a further example is even more rigid than the battery module housings 3.

Each guide 9 is independently moveable relative to the battery module housings 3 in the transverse direction y. The maximum possible relative displacement of the battery module housings 3 may limited by stops, not illustrated, or the side sills of the electrified vehicle to an amount $\Delta y$ max.

Further, as illustrated in FIG. 2, the mutually facing surfaces of the battery module housings 3 comprise elongated holes 5 that extend in the transverse direction y at least over a length that corresponds to the sum of $\Delta y$ max and of the thickness of the flexible lines 6. The guide 9, and in particular the vertical section of the guide 9, also includes an elongated hole 10. In one example, the elongated holes 5, 10 are of equal length. In normal conditions, when the battery housing 1 is not deformed and the battery module housings 3 are not displaced relative to one another, adjacent elongated holes 5, 10 are at least partially aligned with one another. In a particular example, the adjacent elongated holes 5, 10 are fully aligned with one another over their entire length in normal conditions.

Figure 3:
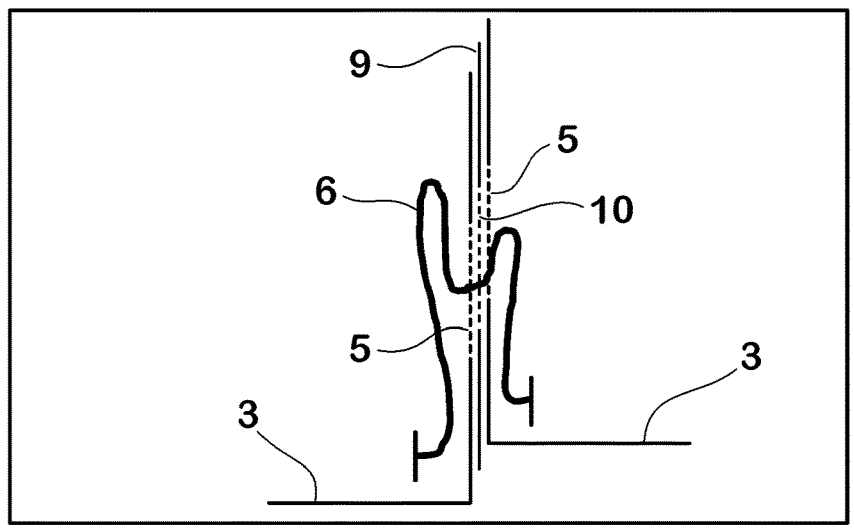
FIG. 3 is a schematic view of two adjacent battery module housings.

FIG. 3 is a schematic view illustrating how two adjacent battery module housings 3 are connected to one another by means of flexible lines 6. The flexible lines 6 may be high voltage power cables and/or coolant pipes mechanically, fluidly, and/or electrically connecting the adjacent battery module housings 3. The flexible lines 6 pass through the elongated holes 5, 10 and have an overall length that corresponds to or is slightly greater than $\Delta y$ max. Thus, the flexible lines 6 will not break if the battery module housings 3 are displaced relative to one another.

Figure 4:
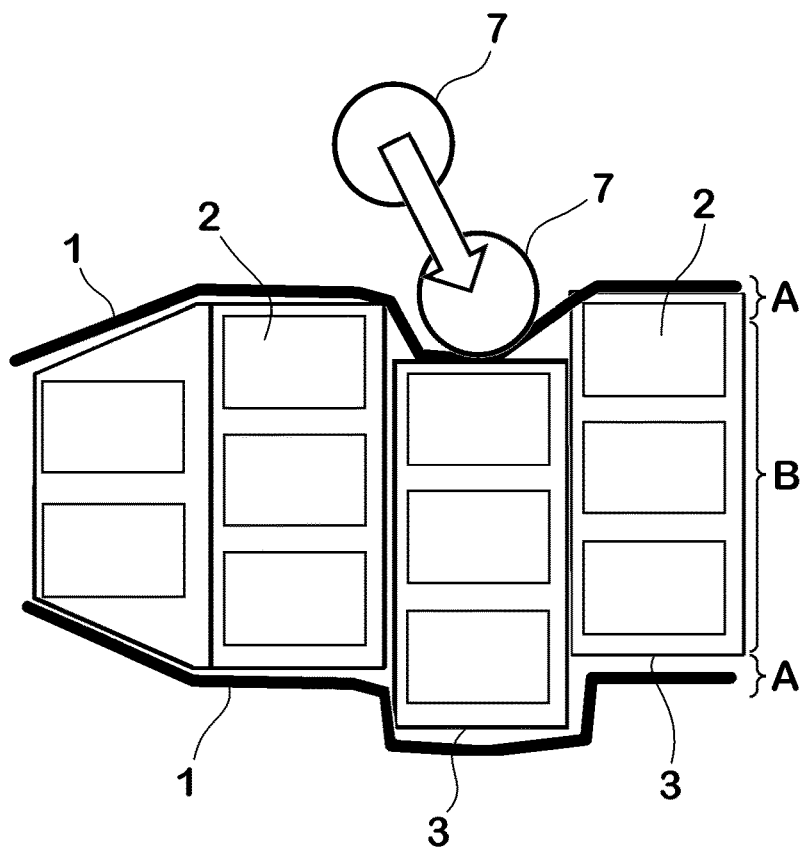
FIG. 4 schematically illustrates the example battery arrangement from a top view, and is representative of a condition in which the battery arrangement has been deformed by a first example side impact.
Figure 5:
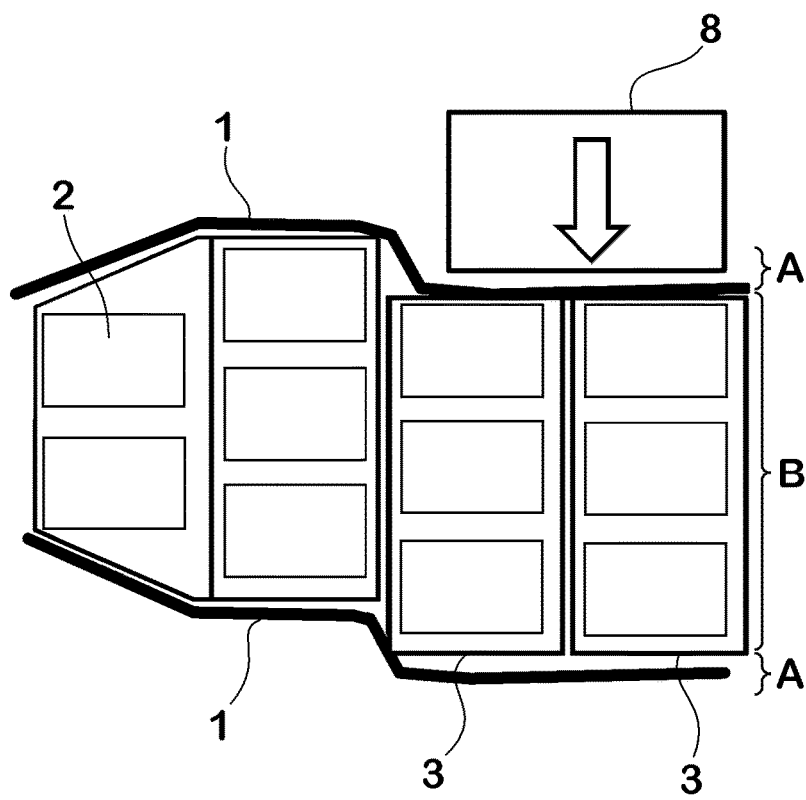
FIG. 5 schematically illustrates the example battery arrangement from a top view, and is representative of a condition in which the battery arrangement has been deformed by a second example side impact.

Relative transverse displacements of the battery module housing 3 may occur in particular in the event of a side impact. Two example side impact situations that are represented in FIGS. 4 and 5. FIG. 4 is representative of a side impact with an object such as a pole, represented by cylindrical impact body 7. FIG. 5 is representative of a side impact with a vehicle, for example, as represented by cuboid body 8.

With reference to FIGS. 4 and 5, the disclosed battery arrangement permits those battery module housings 3 and guides 9 subjected to an impact force to move relative to the others in the transverse direction y. Since the battery housing 1 is less rigid in the transverse direction y, the impact force is transmitted through the battery housing 1 to only the battery module housings 3 and guides 9 adjacent the location of the impact. The affected battery module housings 3 and guides 9 transmit impact energy to an opposite side of the vehicle. In this manner, almost the same amount of impact energy is distributed and absorbed on both sides of the battery arrangement, namely approximately in the zones A marked in FIGS. 4 and 5. On the other hand, the battery arrangement is essentially incompressible in the middle zone B.

As generally mentioned above, the guides 9 permit the battery module housings 3 to slide relative one another without becoming jammed, as may otherwise easily occur particularly during a side impact. Further, because of the I-shaped cross-section of the guides, the guides 9 are particularly well suited for transmitting forces, which, in turn, allows the battery module housings 3 to be less robust and lighter than if the battery module housings 3 alone were used to transmit the impact forces.

Directional terms such as "fore," "aft," "transverse," "longitudinal," "vertical," "front," "rear," "side," etc., are used herein with reference to the normal operational attitude of a motor vehicle. It should be understood that terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A battery arrangement for an electrified vehicle, comprising:
 a guide; and
 first and second battery modules each including a battery module housing, wherein the guide is arranged at least partially between adjacent surfaces of the battery module housings and is configured to permit the first and second battery modules to slide relative to one another in a transverse direction of the electrified vehicle,
 wherein the guide includes a vertical section arranged longitudinally between the adjacent surfaces of the battery module housings, and further includes horizontal projections projecting from ends of the vertical section and configured to restrict vertical movement of the first and second battery modules, and
 wherein the adjacent surfaces of the battery module housings include an aft surface of the battery module housing of the first battery module and a fore surface of the battery module housing of the second battery module.

2. The battery arrangement as recited in claim 1, wherein the guide has an I-shaped cross-sectional profile.

3. The battery arrangement as recited in claim 1, wherein the first and second battery modules each have a length extending in the transverse direction.

4. The battery arrangement as recited in claim 1, wherein:
 the adjacent surfaces of the battery module housings each include an elongated hole extending in the transverse direction, and
 the guide includes an elongated hole extending in the transverse direction.

5. The battery arrangement as recited in claim 4, further comprising at least one flexible line extending between the first battery module and the second battery module by passing through the elongated holes of the battery module housings and the guide.

6. The battery arrangement as recited in claim 5, wherein the at least one flexible line is configured to connect the first battery module to the second battery module either fluidly, mechanically, or electronically.

7. The battery arrangement as recited in claim 4, wherein the elongated holes of the battery module housings and the guide are at least partially aligned with one another in a normal operating condition.

8. The battery arrangement as recited in claim 1, wherein the first and second battery module housings are mechanically connected together by at least one shear bolt configured to break upon application of a force exceeding a predetermined amount.

9. The battery arrangement as recited in claim 1, wherein the first and second battery modules are arranged within a battery housing less rigid in the transverse direction than each of the first and second battery modules and the guide.

10. The battery arrangement as recited in claim 9, wherein the guide is at least as rigid as the first and second battery modules.

11. The battery arrangement as recited in claim 9, wherein the battery housing tapers in a front direction.

12. The battery arrangement as recited in claim 9, wherein the battery arrangement includes at least one additional battery module within the battery housing.

13. The battery arrangement as recited in claim 1, wherein the guide is formed separately from the battery module housings, and the guide is configured to move independently of the first and second battery modules.

14. An electrified vehicle, comprising:
 a battery arrangement positioned on or under a subfloor of the electrified vehicle, the battery arrangement comprising:
  a guide; and
  first and second battery modules each including a battery module housing, wherein the guide is arranged at least partially between adjacent surfaces of the battery module housings and is configured to permit the first and second battery modules to slide relative to one another in a transverse direction of the electrified vehicle,
  wherein the guide includes a vertical section arranged longitudinally between the adjacent surfaces of the battery module housings, and further includes horizontal projections projecting from ends of the vertical section and configured to restrict vertical movement of the first and second battery modules, and
  wherein the adjacent surfaces of the battery module housings include an aft surface of the battery module housing of the first battery module and a fore surface of the battery module housing of the second battery module.

15. The electrified vehicle as recited in claim 14, wherein the guide has an I-shaped cross-sectional profile.

16. The electrified vehicle as recited in claim 14, wherein the guide is formed separately from the battery module housings, and the guide is configured to move independently of the first and second battery modules.

17. The electrified vehicle as recited in claim 14, wherein the electrified vehicle includes front and rear axles extending in the transverse direction.

* * * * *